United States Patent [19]

Winter

[11] Patent Number: 4,557,559

[45] Date of Patent: Dec. 10, 1985

[54] PROCESS FOR DIE FORMING A TUBULAR MEMBER AT A REDUCED DRAWING FORCE

[75] Inventor: Joseph Winter, New Haven, Conn.

[73] Assignee: Olin Corporation, New Haven, Conn.

[21] Appl. No.: 430,069

[22] Filed: Sep. 30, 1982

[51] Int. Cl.[4] .............................................. G02B 5/16
[52] U.S. Cl. .................................. 350/96.23; 228/125
[58] Field of Search ............... 228/171, 170, 172, 144, 228/146, 147, 156, 5.7, 125; 72/368; 350/96.23

[56] References Cited

U.S. PATENT DOCUMENTS

| | | | |
|---|---|---|---|
| 647,868 | 4/1900 | Patterson | 72/128 |
| 1,712,090 | 5/1929 | Murphy | 228/144 |
| 2,730,135 | 1/1956 | Wallace | 228/171 X |
| 3,570,356 | 3/1971 | Williams | 228/125 |
| 3,590,622 | 7/1971 | Elge et al. | 228/147 X |
| 3,912,151 | 10/1975 | Martin et al. | 228/170 X |
| 4,275,294 | 6/1981 | Davidson | |
| 4,341,440 | 7/1982 | Trezeguet et al. | 350/96.23 |
| 4,372,792 | 2/1983 | Dey et al. | 156/48 |

FOREIGN PATENT DOCUMENTS

| | | |
|---|---|---|
| 895094 | 5/1983 | Belgium . |
| 2637157 | 2/1978 | Fed. Rep. of Germany . |
| 21425 | 7/1975 | Japan ............................... 228/125 |
| 112438 | 12/1962 | Pakistan ............................ 72/368 |
| 1583520 | 1/1981 | United Kingdom . |
| 1592191 | 7/1981 | United Kingdom . |
| 2088583A | 6/1982 | United Kingdom . |
| 2091903A | 8/1982 | United Kingdom . |
| 619527 | 8/1978 | U.S.S.R. ............................ 228/125 |

OTHER PUBLICATIONS

Wilkins, "How Small Can an Electro-Optical Transoceanic Cable Be?", International Telemetry Society Conference, San Diego, CA, Oct. 13-15, 1981.
Begeman et al., *Manufacturing Processes*, Sixth Edition, John Wiley and Sons, Inc., 1957, pp. 283-285.

*Primary Examiner*—Kenneth J. Ramsey
*Attorney, Agent, or Firm*—Barry L. Kelmachter; Howard M. Cohn; Paul Weinstein

[57] ABSTRACT

A process for die forming a tubular member from a metal or metal alloy strip at a reduced drawing force is described herein. The process uses shaping of at least one edge portion of each strip prior to drawing each strip through a die. The shaping reduces the drawing force exerted on the strip material and/or any joint.

9 Claims, 5 Drawing Figures

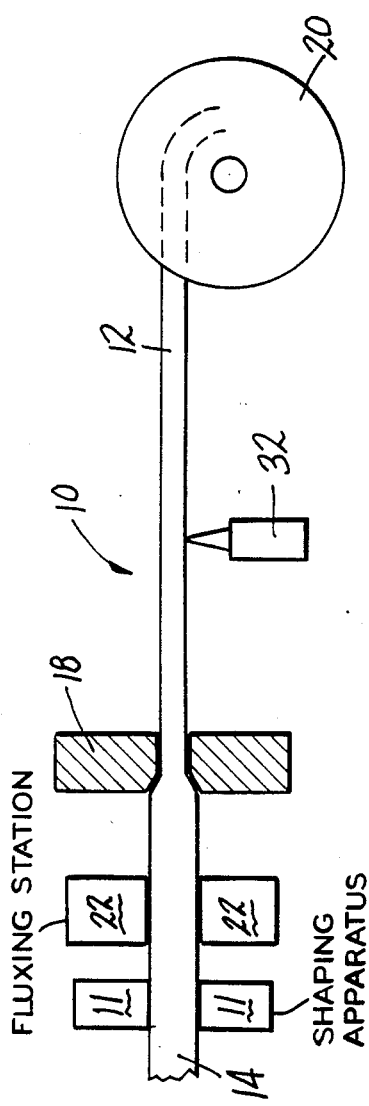
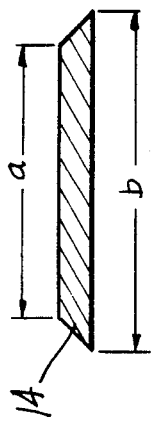
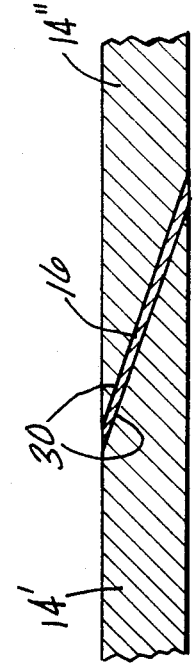
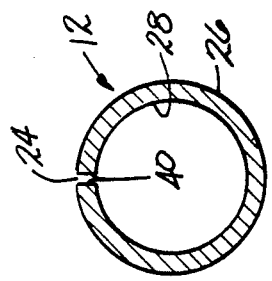
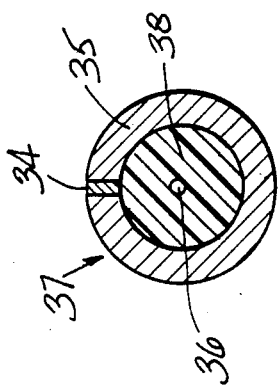

PROCESS FOR DIE FORMING A TUBULAR MEMBER AT A REDUCED DRAWING FORCE

The invention disclosed herein relates to a process for forming tubular members.

In forming communication cables, it is often necessary to provide a metal or metal alloy tubular member or tube to protect critical elements such as optical fibers, electrical conductors, and the like. In addition to protecting critical elements, the tubular member may serve as an electrical conductor itself or act as a fluid barrier.

Generally, the tubular members required for such cables have relatively long lengths, i.e. multi-kilometer lengths. Finding a suitable technique for forming such long tubes can be a problem. As well as dealing with the length problem, the tube forming technique must be capable of forming tubular members that can be readily and effectively sealed. In optical fiber cable fabrication techniques, these problems are compounded by the problems associated with insertion of the optical fiber or fibers and/or any void filler into the tube.

Various procedures have been tried in the prior art to form such tubular members. One known approach roll forms a strip or tape of metal or metal alloy into a tube. In roll forming, the strip of metal or metal alloy passes through a series of roll assemblies. The roll assemblies incrementally close the edges of the strip until a tube is formed. Within this art, it is known to roll form a tube from a tapered metal or metal alloy strip. When using this technique in fabricating an optical fiber cable, there is a substantial risk of the rolls forming the inner diameter of the tube damaging the optical fiber or fibers. U.S. Pat. No. 4,275,294 to Davidson and the paper "How Small Can An Electro-Optical Transoceanic Cable Be?" by G. Wilkins, International Telemetry Society Conference, San Diego, Calif., Oct. 13–15, 1981 describe optical fiber cable constructions having a roll formed tubular member.

Another approach for forming a tube from strip material is die forming. In this approach, the tube is formed by drawing a strip of metal or metal alloy through a die. *Manufacturing Processes*, Sixth Edition by Myron L. Begeman et al., John Wiley and Sons, Inc., 1957, pp. 283–285 suggests various dies for forming a tube from strip material. The force exerted on the strip during this process is known as the drawing force. The drawing force has two components, the forming force and the deformation force. The forming force is the useful work component in making the tube. It arises from applying tension to the strip to draw the strip through the die and to cause the strip to fold over and form a tube. The deformation force is the work component that increases the length by redistributing the excess volume of strip material.

In forming relatively long length tubular members, it is often necessary to join together several shorter lengths or coils of strip material. In subsequent die forming, the drawing force acts not only on the parent strip material but on any joints interconnecting the strips. When the drawing force exceeds the tensile breaking strength of the parent strip material or the tensile breaking strength of a joint, the material will break. Breakage generally occurs in the die while the strip is changing directions. While it is possible to repair the broken strip by patching the pieces together, the patch often adversely affects desirable mechanical properties such as temper, electrical conductivity, thermal conductivity and tensile strength.

The problem of material breakage, particularly at a joint, as a result of excessive drawing force is particularly troublesome in die forming techniques where the tube is formed from a strip having an initial cross-sectional area greater than the cross-sectional area of the tube to be formed. This approach is used where it is desired to assure sufficient interference compressive force acting on the edges that the formed tube has a longitudinal seam created by substantially abutting edges which are held closed by residual compressive stresses. This technique compounds the drawing force problem because the extra area increases the deformation force which in turn increases the drawing force.

In accordance with the instant invention, a process for forming a tubular member or tube from one or more metal or metal alloy strips at a reduced drawing force is provided. The process of the instant invention utilizes a strip or strips having edge portions shaped to reduce the drawing force created in die forming techniques.

While one could eliminate the deformation force altogether, it is important that the formed tube be as hard as possible. Since the deformation force extension increases the mechanical properties of the material forming the tube, some deformation is desirable. The process of the instant invention has been found to have sufficient deformation to increase the temper and the ultimate yield strength of the material without decreasing formability. The process of the instant invention draws the strip through a die to work harden the material and increase its temper and ultimate yield strength. In addition, the tube formed by the instant process tends to have a substantially square and tight seam that may be easily sealed with a relatively high degree of hermeticity.

The process of the instant invention is equally applicable to a single length of strip or a plurality of joined strips. It is particularly advantageous in reducing the drawing force exerted on any joints and reducing the likelihood of breakage at the joint. Either the entire length of strip may have shaped edge portions prior to tube forming or, in a preferred embodiment, only those edge portions adjacent a joint are shaped. Preferably, the edge portions are shaped prior to any bonding operation to interconnect lengths of strip.

The shaping of the edge portions may be done in any conventional manner. While the edge portions may be provided with a wide variety of suitable shapes, it has been found that providing the edge portions with a trapezoidal cross section is particularly beneficial.

The relatively long length tubular members that can be produced by the instant process have particular utility as metal armoring for optical fiber communication cable cores.

It is an object of the present invention to provide a process for forming a tubular member at a reduced drawing force.

It is a further object of the present invention to provide a process as above for forming a tubular member having a relatively long length.

It is a further object of the present invention to provide a process as above for forming a tubular member with improved mechanical properties.

It is a further object of the present invention to provide a process as above for forming a tubular member suitable for use in optical fiber communication cables.

These and other objects will become more apparent from the following description and drawings.

Embodiments of the process for forming a tubular member at a reduced drawing force in accordance with the instant invention are shown in the drawings wherein like numerals depict like parts.

FIG. 1 is a schematic representation of an apparatus for die forming a tubular member from strip material.

FIG. 2 illustrates a cross-sectional view of a plurality of strips joined together.

FIG. 3 illustrates a cross-sectional view of a strip shaped in accordance with the instant invention.

FIG. 4 illustrates a cross-sectional view of a tubular member formed by the apparatus of FIG. 1.

FIG. 5 is a cross-sectional view of an optical fiber communication cable core.

In accordance with the present invention, it is proposed to reduce the drawing force exerted on a another strip during a die forming operation. This is accomplished by appropriately shaping edge portions of each strip to reduce the deformation force created between the strip material and the die.

Referring now to FIG. 1, an apparatus 10 for forming a strip 14 into a tubular member or tube 12 is illustrated. Strip 14 is normally received in the form of a coil and comes from suitable payoff equipment not shown. The payoff equipment should be such that a back tension may be applied to the strip if desired.

Strip 14 may comprise a single length of material or may be a plurality of lengths such as strips 14' and 14" in FIG. 2 joined together. If strip 14 comprises a plurality of joined lengths, the lengths may be joined in any suitable manner. For example, conventional joining techniques such as brazing, soldering, welding, and diffusion bonding may be used. One particular joining technique that has been found to be quite suitable is described in co-pending U.S. patent application Ser. No. 430,433 filed Sept. 30, 1982 to Crane et al., which is hereby incorporated by reference.

Strip 14 may be formed from any metal or metal alloy that exhibits a desired set of strength, formability and/or conductivity characteristics. The strip may be in any desired condition. Preferably, strip 14 is in a wrought and partially work hardened form. It should have a hardness or strength sufficient to enable it to be formed into a tube by drawing through die 18.

Prior to being fed into apparatus 10, the strip 14 may be fed to a suitable cleaning system not shown for removal of contaminants. The cleaning system utilized will depend upon the metal or metal alloy forming the strip and the nature of the contaminants to be removed. Any suitable conventional cleaning system known in the art may be utilized.

Strip 14 is fed into apparatus 10 by connecting it via any suitable means known in the art to take-up reel 20. Take-up reel 20 applies a tension force to the strip and draws or pulls the strip through forming die 18. Forming die 18 may comprise any suitable die arrangement known in the art. *Manufacturing Processes*, Sixth Edition, by Myron L. Begeman et al., John Wiley and Sons, Inc., 1957, pp. 283–285 suggests various die arrangements suitable for forming a tube from strip material. Preferably, die 18 is a metal die arrangement.

Prior to being fed into die 18, strip 14 preferably passes through a fluxing station 22. The fluxing station 22 comprises any conventional means known in the art for applying any conventional flux. Fluxing station 22 applies the flux to the edges of the strip. Since the fluxing station is not absolutely necessary to form the tube 12, it may be omitted if desired.

Drawing the strip through the die 18 forms the strip into the partial cylindrical "C" shape shown in FIG. 4. In order that the longitudinal seam 24 created during tube forming will be placed into significant compression, thereby remaining substantially closed even if spring back occurs, strip 14 preferably has an initial cross-sectional area greater than the cross-sectional area 26 of the formed tube. It has been found that by providing the strip with such an initial area, sufficient interference compressive force acts on the strip edges that a substantially square and tight seam formed by the substantially abutting edges 40. This type of seam may be more readily and more effectively sealed providing improved hermeticity and generally requires less sealing material. The initial area should be about 5% to about 20%, preferably from about 10% to about 15%, greater than the tube cross-sectional area.

When drawn through the die, strip 14 and any joint 16 are subjected to a force known as the drawing force. The drawing force is equal to the sum of two other forces, the forming force and the deformation force. The forming force is essentially the force required to fold the strip over and form the tube 12. The forming force arises from the tension applied to the strip to pull it through the die. The deformation force causes tube extension and arises out of a redistribution of the strip material. The deformation force can be particularly troublesome in situations where there is a substantial excess volume of strip material.

It has been found that the deformation force and consequently the drawing force exerted on the strip material and/or joint 16 may be reduced by shaping the edge portions of the strip. By reducing the drawing force, the likelihood of the drawing force exceeding the tensile breaking strength of the strip material and/or the joint and causing breakage is reduced. It has been discovered that providing the strip edge portions with a trapezoidal cross-sectional shape such as that illustrated in FIG. 3 having beveled edges is particularly advantageous. When drawn through the die, the trapezoid base b forms the outer tube circumference 26 and the shorter side a forms the inner tube circumference 28.

It should be recognized that the strip edge portions could be provided with other suitable cross-sectional shapes. In lieu of the trapezoidal shape illustrated in FIG. 3, any other suitable shape may be utilized as long as it leads to a reduction in the drawing force.

Co-pending U.S. patent application Ser. No. 272,154, filed June 10, 1981 to Winter et al. now abandoned, which is hereby incorporated by reference, identifies other edge shapes that could be used.

Providing the edge portions of the strip with a shaped cross section has several advantages. First, it reduces the amount or volume of material that has to be redistributed, thus lowering the deformation force. Second, the material is redistributed so that the seam 24 is characterized by substantially abutting and substantially parallel edges 40.

While it is permissible to shape the edge portions of an entire length of strip material, it is not practical to do so for very long strip lengths. The primary consideration against shaping long strip lengths is cost. When forming relatively long length tubes from a plurality of joined strips, it is preferable to shape only those edge portions adjacent the joint or joints 16. This is preferred because the region around a joint tends to be the more critical area since there is a greater likelihood of breaking the strip at a joint. This is primarily due to the fact that the joint tends to have a lower tensile breaking strength than the parent strip material.

Shaping of the strip edge portions may be performed in any suitable manner by any well known shaping means 11. The shaping means 11 may comprise any conventional scarfing apparatus, skiving apparatus, cutting blade, or the like. Where a plurality of strips are to be joined together, shaping preferably occurs prior to any bonding operation. For example, mating surfaces 30 of strips 14' and 14" would be shaped prior to the formation of joint 16. As well as shaping the strip edge portions prior to bonding, it is possible to shape the strip edge portions and the joint after bonding; however, care must be taken not to disturb the integrity of the joint.

If the strip to be shaped is a single length of material, shaping preferably occurs prior to the strip passing through the fluxing station 22.

As well as reducing the drawing force and forming a substantially square and tight seam, it has been found that the process of the instant invention has other advantages. During passage of the material through the die, the material tends to become more work hardened. As a result, mechanical properties of the material such as its temper and its yield strength tend to increase. For example, when drawn through a forming die, a strip formed from copper alloy 151, a copper-zirconium alloy, in soft temper was found to form a tube having a spring temper. The ultimate yield strength of the material increased from about 40 ksi to about 50 ksi.

It has been found that the instant process causes an extension in the tube length as compared to the original length of the strip. This extension is effected without any substantial wall thinning. The tube extension has been found to be substantially equal to any difference between the initial strip cross-sectional area and the tube cross-sectional area.

After tube 12 has been formed, it may be passed over sealing station 32 to close the longitudinal seam 24. Sealing station 32 may comprise any conventional sealing apparatus for soldering, welding, brazing or applying any other suitable sealing technique. Preferably, seam 24 is filled with a suitable closing material 34 such as solder. One particularly suitable technique for soldering the seam 24 is shown in co-pending U.S. patent application Ser. No. 413,486, filed Sept. 1, 1982 to Winter et al., now U.S. Pat. No. 4,508,423 which is hereby incorporated by reference.

The tube formed in accordance with the process of the instant invention has been found to have particular utility in optical fiber communication cables. In these cables, the tube may form part of the optical fiber communication cable core 37. The tube may be used as a metal armoring 35 to protect the optical fiber or fibers. As well as serving as armoring, the tube 35 may act as an electrical conductor and/or a fluid barrier.

As shown in FIG. 5, the metal armoring 35 surrounds one or more optical fibers 36. Each optical fiber is generally embedded within a suitable plastic protective layer 38 such as a polyethylene sheath. The outer diameter of the sheath may be substantially equal to the inner diameter of the armor tube 35 or there may be a void between each sheath 38 and the tube 35. If a void is present, it may be filled with a suitable filler material to further protect the optical fiber. Alternatively, the filler material may be omitted.

There are many techniques known in the art for inserting an optical fiber into a tube. Any conventional technique may be utilized to insert the fiber or fibers into the tube. However, it is preferred to insert the optical fiber or fibers in accordance with the techniques illustrated in co-pending U.S. patent application Ser. No. 272,154, filed June 10, 1981 now abandoned; Ser. No. 408,087, filed Aug. 13, 1982 now abandoned; and Ser. No. 413,846, filed Sept. 1, 1982, now U.S. Pat. No. 4,508,423 all to Winter et al. and co-pending U.S. patent application Ser. No. 395,443, filed July 6, 1982, to Pryor et al., now U.S. Pat. No. 4,470,702 which are hereby incorporated by reference.

The tube formed in accordance with the instant invention may have any desired thickness to diameter ratio. For optical fiber cable cores, the thickness to diameter ratio of the tube preferably is from about 0.02:1 to about 0.5:1 and most preferably from about 0.1:1 to about 0.3:1.

The tube 12 may be formed from any desired metal or metal alloy. Where combinations of strength and conductivity are required, copper and its alloys and steel, e.g. stainless steel, may be utilized.

While the seam formed in accordance with the instant process should remain substantially closed, it may be necessary to apply additional compression to effectively seal it. The additional compression may be applied in any suitable manner by any conventional apparatus not shown known in the art.

While the tube formed by the instant process has been mentioned as having particular utility in optical fiber communication cables, it may also be used in other environments. For example, the tube may be used as a pipe or a conduit.

As used herein the phrase shaping edge portions also includes shaping part of the face of an edge portion.

The patent, patent applications, and publications set forth in the specification are intended to be incorporated by reference herein.

It is apparent that there has been provided in accordance with this invention a process for die forming a tubular member at a reduced drawing force which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A process for forming an optical fiber communication cable, said process comprising:
   providing at least two metal or metal alloy strips;
   forming at least one joint between said strips to form a continuous length of strip material;
   shaping adjoining ones of said strips to bevel at least one longitudinal edge of each said strip, said shaping occurring only in an area adjacent said at least one joint;
   pulling said continuous strip material through a die to form a tubular member, said shaping step reducing the drawing force exerted on said at least one joint as said joined strips pass through said die; and
   inserting at least one optical fiber into said tubular member.

2. An optical fiber communication cable comprising:

a drawn tubular member having improved mechanical properties formed by pulling at least two joined metal or metal alloy strips through a die;

at least one longitudinal edge of each said strip being beveled only in an area where one of said strips is joined to an adjacent one of said strips to reduce the drawing force acting on said joined strips at said joint during tubular member formation; and at least one optical fiber within said tubular member.

3. The process of claim 1 wherein said shaping step comprises:

shaping each of said strips to have a trapezoidal cross-sectional shape in said area adjacent said at least one joint.

4. The process of claim 1 wherein:

said shaping step occurs prior to said at least one joint forming step.

5. The process of claim 1 wherein:

said shaping step occurs after said at least one joint forming step and before said pulling step.

6. The process of claim 1 wherein:

said joint forming step comprises a plurality of joints between said strips; and said shaping step comprises shaping adjacent ones of said strips in each area adjacent one of said joints.

7. The optical fiber communication cable of claim 2 further comprising:

each said strip having a trapezoidal cross-section configuration in said area where said strip is joined to said adjacent strip.

8. The optical fiber communication cable of claim 2 further comprising:

said tubular member having a substantially square and tight seam formed by substantially abutting edges of said strips.

9. The cable of claim 8 further comprising:

said seam being filled by a closing material.

* * * * *